Sept. 9, 1958  R. M. HUTCHINSON  2,851,048
REGULATION CONTROL SYSTEM FOR MINIMIZING AND/OR MAXIMIZING
THE OUTPUT SIGNAL OF A CONTROLLER
Filed Feb. 7, 1955
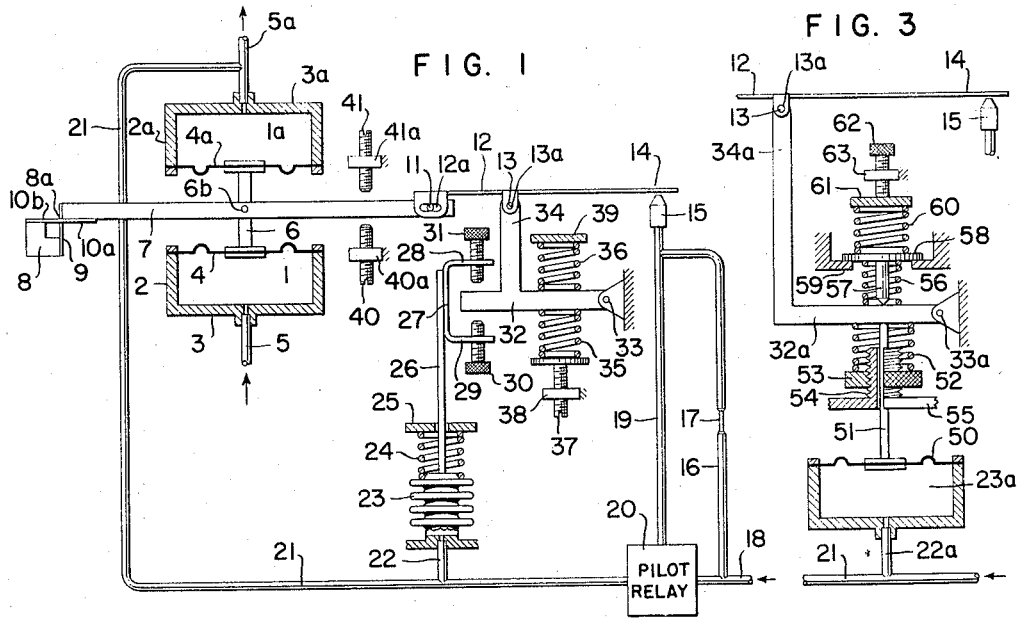
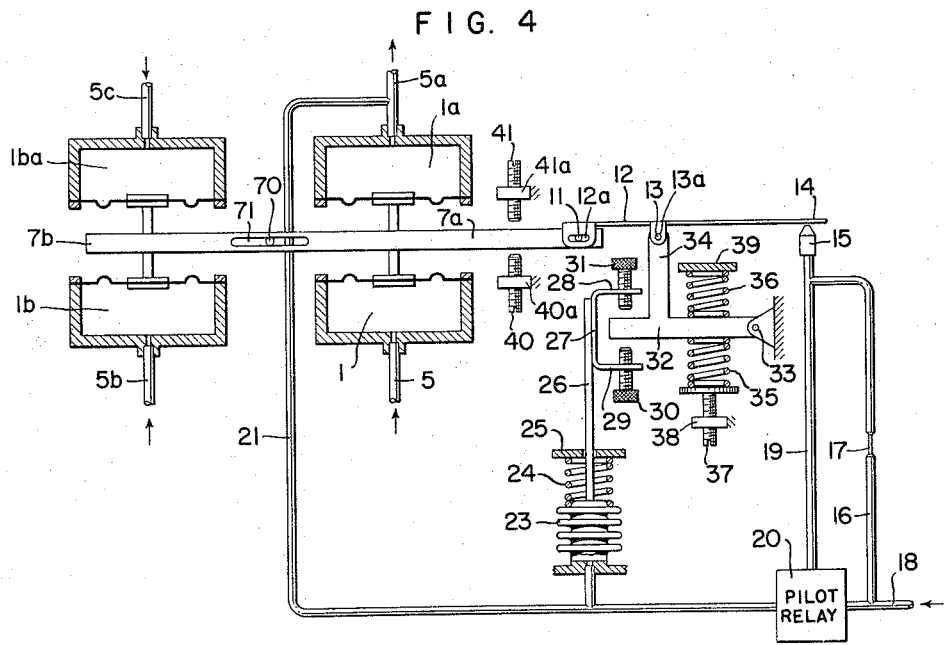
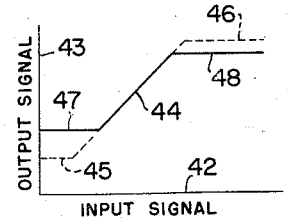
INVENTOR.
ROBERT M. HUTCHINSON
BY
ATTORNEY.

United States Patent Office 2,851,048
Patented Sept. 9, 1958

2,851,048

REGULATION CONTROL SYSTEM FOR MINIMIZING AND/OR MAXIMIZING THE OUTPUT SIGNAL OF A CONTROLLER

Robert M. Hutchinson, Havertown, Pa., assignor to Minneapolis-Honeywell Regulator Company, Minneapolis, Minn., a corporation of Delaware Application February 7, 1955, Serial No. 486,383

15 Claims. (Cl. 137—86)

A general object of the present invention is to provide novel and effective means for confining the value of a control system signal to one or another set of predetermined maximum and minimum control ranges. Heretofore such control signal range values have been regulated, in the case of a controller having remotely set control indexes, by the use of mechanical stops in the index motion of the apparatus. Such range control by mechanical index motion stops is impractical in some apparatus in which close control of the maximum and minimum values of the control range is practically important.

In particular, it is not practically feasible to use mechanical index motion stops in the control apparatus of the extensively used type known as a force balance control device, because of the extremely small movement involved in the parts necessary for the operation of such a device. One practical form of the force balance type of device is disclosed in the patent of Edward C. Grogan, 2,774,367, patented Dec. 18, 1956.

A specific object of the invention is to provide apparatus well adapted for use in so regulating the operation of a force balance control device as to limit both the maximum and minimum control values notwithstanding the typical small range of movements of such a controller. Preferred forms of the invention are characterized by the means provided for developing negative feedback control forces.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a digrammatic illustration of one desirable embodiment of the present invention including means for developing a negative feedback control force;

Fig. 2 is a diagram illustrating the manner in which variations in input and output signals may be made;

Fig. 3 illustrates an alternative means for establishing and modifying a negative feedback control force which is shown in a position to deliver an output signal which is between a predetermined minimum and maximum level; and Fig. 4 diagrammatically illustrates a modification of the apparatus shown in Fig. 1 including a plurality of input signals and a single output signal.

Unless otherwise noted, corresponding reference characters in various figures carry corresponding reference characters.

The control apparatus shown diagrammatically in Fig. 1 comprises input and output signal units 1 and 1a, respectively. As shown, the unit 1 comprises a chamber with rigid side and bottom walls 2 and 3, respectively, and a top wall 4 in the form of a flexible diaphragm.

An input signal pressure is transmitted to the chamber 1 through a pipe 5 from a source of such pressure. The diaphragm 4 has an uprising rigid rod 6 supported by the central portion of the flexible wall 4. The rod 6 transmits the fluid pressure in the chamber 1 by way of a suitable pivot means e. g. the pin 6b to the beam 7 and diaphragm 4a. The unit 1a is above the upper side of the beam 7 and is shown as differing from the chamber 1 only in that it is inverted. The chamber 1a comprises elements 2a, 3a, 4a, and 5a similar in form to the parts 1 to 5 of the element 1. Functionally the elements 5 and 5a differ in that the input channel 5 transmits an input signal to the chamber 1, whereas the pipe 5a transmits the output signal away from the chamber 1a.

As shown, the beam 7 has one end connected by a pivot arranged to turn about a pivot axis 8a and supported by a stationary member 8. The pivot means shown comprises an ordinarily vertical flexible pivot plate 9 having an upper portion alongside and attached to one end of the beam 7, and having a lower portion alongside and attached to an adjacent portion of the beam support 8. The pivotal connection between the beam 7 and the support 8 also comprises a flexible metallic plate having a first portion 10a beneath and attached to the under side of the beam 7 and a second portion 10b which extends over and is attached to the upper side of the stationary support 8.

The end of the beam 7 remote from the support 8, is connected by a pin 11 to one end of a lever-like flapper valve 12. The latter has an end portion formed with a slot 12a extending longitudinally of the lever for receiving pin 11. An intermediate portion of the flapper valve 12 has an aperture 13a for accommodating a pivot pin 13 which is adjusted as hereinafter described. The end portion 14 of the flapper valve 12 remote from the beam 7, extends over the uprising bleed orifice 15 of a conduit 16. The latter passes fluid to the bleed orifice 15 through a restricted conduit portion 17. As shown, the conduit 16 receives fluid under pressure from a supply pipe 18. The fluid thus supplied to the conduit 16 may well be air under a customary air control pressure of 20 p. s. i. The pressure of the air passing to the orifice 15 through the restriction 17 decreases below and rises toward the pressure in the conduit 16 as the flapper valve end 14 moves away from and toward the nozzle 15. The portion of the conduit 16 between the restriction 17 and bleed orifice 15 is connected by a pipe 19 to a pilot relay 20. The pilot relay 20 is also in direct communication with the conduit 16 and supply pipe 18. The relay 20 has an output pipe 21 discharging into the output pipe 5a of the signal unit 1a. The fluid discharged by the relay 20 is supplied by the pipe 18, but the discharge pressure is regulated by the pressure in the conduit 19.

The output pipe 21 is also connected through a pipe 22 to a bellows chamber 23 which has a stationary lower end. Upward movement of the upper end of the bellows 23 is opposed by a helical spring 24 interposed between the upper end wall of the bellows 23 and a stationary abutment 25. The upper end wall of the bellows 23 is connected to the lower end of an uprising arm 26 which has its upper end connected to a yoke 27. The yoke 27 has upper and lower transverse end portions 28 and 29. A screw 30 extends upward through the lower end piece 29, and a screw 31 extends downward through the upper end portion 28. The screws 30 and 31 straddle the end of a horizontal beam 32 which has its other end pivoted to turn about a fixed pivot 33. The distance between the adjacent ends of the screws 30 and 31 is greater than the vertical extent of the beam or arm 32. In consequence, both screws 30 and 31 are simultaneously out of engagement with the beam 32 at times, and each screw may separately engage the beam from time to time.

Intermediate its ends the beam 32 has an uprising arm 34 which carries the pin 13 extending through the aperture 13a in the intermediate portion of the flapper valve 12. The beam 32 is biased for adjustment angularly about the pivot 33 by lower and upper springs 35 and 36. The springs 35 and 36 tend to hold the beam 32 in a normal position which may be adjusted by the adjustment of the lower end of the spring 35. The lower spring 35 acts between the lower side of the beam 32 and an abutment in the form of a screw 37 threaded through a stationary part 38. The spring 36 acts between the upper side of the beam 32 and a stationary abutment 39. The maximum up and down movements of the free end of the beam 7 are separately controlled by lower and upper screws 40 and 41. These screws are threaded through stationary elements 40a and 41a respectively below and above the beam.

As previously indicated, Fig. 1 illustrates apparatus that can be adjusted to regulate the minimum and maximum signals that a force balance control device of the commercial type can deliver in response to a given input signal. In normal operation, the beam 7 is rotated in a counterclockwise direction about the pivot 8a when the input signal being transmitted to chamber 1 is increased. This action tends to rotate the flapper valve about the pivot pin 13 toward the nozzle 15. The increased pressure in the nozzle, resulting from such motion, is proportionately amplified by a pilot valve 20 and is transmitted to a bellows 23 and feedback chamber 1a. The force of this amplified signal is permitted to act on the diaphragm in chamber 1a so as to neutralize the effect of an increase in the input signal in the conventional "force balance" manner. Should this signal exceed a predetermined maximum or drop below a predetermined minimum as this latter action is taking place, bellows 23 and the adjustable stops 30 and 31 attached thereto are moved respectively in an upward or downward direction. During upward movement the lower stop 30 forces the beam or arm 32, the flapper valve pivot pin 13 and the flapper valve 12 to move in an upward direction.

This action will cause the flapper valve to move away from the fixed nozzle 15 a distance which is proportional to the initial downward movement of the flapper valve, but which will not exceed a predetermined maximum determined by the setting of the lower stop 30 relative to the end portion 29. Movement of the flapper in this upward direction will reduce the pneumatic signal being transmitted to the bellows 23 and feedback chamber 1a so that the output signal of the controller will not exceed the predetermined maximum.

When the input signal drops to a level below a predetermined minimum, the stop 31 attached to the bellows 23 through arm 26 and yoke 27 will act upon the flapper in a downward direction and thus maintain the output signal of the controller at a minimum. By providing a pair of adjustable stops 40 and 41 the flexible diaphragms 4 and 4a will be prevented from being ruptured. Thus motion balance has been added to a conventional force balance system by adding a bellows actuated, stop actuating means 23—31. A novel characteristic of the apparatus shown in Fig. 1 is that the motion balance means including elements 23—31, permit a force balance device, such as a stack type controller, to deliver an output signal which will be no greater, or less than, a desirable predetermined value.

As previously mentioned, a desirable characteristic of the invention disclosed in Fig. 1 is the capacity of the apparatus for separate and independent adjustments of the minimum and maximum values of the output signal. This capacity is diagrammatically illustrated in Fig. 2. As diagrammatically shown in this Fig. 2, the line 44, which is inclined both to the line 42 and to the line 43, represents the full range of output signal variation obtainable when the apparatus shown in Fig. 1 is arranged for operation between the minimum output signal value indicated by the line 45, and the maximum output signal value represented by the horizontal line 46. In Fig. 2, the horizontal line 47 indicates a minimum value of the output signal, and the horizontal line 48 designates a maximum value of the output signal resulting from an adjustment of screws 31 and 30 other than that shown in Fig. 1.

Apparatus of the type shown in Fig. 1 may take other forms than that shown by way of example in Fig. 1. Thus in Fig. 3, I have illustrated a modification of the apparatus shown in Fig. 1 for controlling the movement of a beam or arm 32a about its supporting pivot 33a. In Fig. 3, the means for turning the beam 32a about its supporting pivot comprises an expansible pressure chamber 23a having a flexible upper end wall or diaphragm 50 and to which the output signal pressure is transmitted from the pipe 21 by a branch pipe 22a. The central portion of the diaphragm 50 is engaged by the lower end of an uprising thrust member 51. The upper end of the thrust member 51 engages the under side of the beam 32a. Thus the expansible chamber 23a and thrust member 51 subjects the free end of the beam 32a to a lifting action generally like the action on the beam 32 by the bellows 23, arm 26 and screw 30 of Fig. 1.

In Fig. 3, a helical spring 52 which surrounds the upper portion of the thrust member 51, is normally compressed between the under side of the member 32a and the upper side of an annular member 53. The latter surrounds and is threaded on a tubular body 54 which surrounds the thrust member 51 and is shown integrally connected to a stationary annulus 55. The beam 32a of Fig. 3 is subjected to depressing means comprising a helical spring 56 and a stem 57 coaxial with the spring 56 and each of which engages the upper side of the beam 32a. The upper end of the stem 57 is rigidly connected to the central portion of a disc 58. The peripheral portion of the disc 58 normally engages and rests on a stationary annulus 59. A helical spring 60 is coaxial with the stem 57 and thrust element 51, and is compressed between the disc 58 and a disc 61. The latter has an uprising stem 62 which extends through and is in threaded engagement with a stationary element 63.

The value of the minimum output signal is determined when the combined upward force of the diaphragm actuated thrust member 51 and compressed spring 52 is reduced to such a magnitude that this combined force can no longer overcome the downward force of spring 56. When this occurs beam 32a can then be moved downward, by the force of spring 56, away from the stem 57. Such a drop in this upward force will occur when the pressure being transmitted by the flapper valve 12 to the diaphragm chamber 23a drops to a low level. By rotating the annular member 53 in the desired direction the initial compressed state of spring 52 may be changed to thus effect a raising or lowering of the aforementioned value of the minimum output signal.

The value of the maximum output signal is determined when the combined upward force of the diaphragm actuated thrust member 51 and compressed spring 52 is increased to such a magnitude that this combined force overcomes the downward force of spring 60 acting in a downward direction through the stem 57 on beam 32a. When this combined upward force occurs the beam 32a can then be moved by this force in a clockwise direction about the pivot 33a.

Such an increase in this upward force will occur when the pressure being transmitted by the flapper valve 12 to the diaphragm chamber 23a increases to a high level. By adjusting the screw means 62, 63 in the desired direction the initial compressed state of spring 60 may be changed to thus effect a raising or lowering of the value of the maximum output signal.

In the modification of the Fig. 1 apparatus illustrated in Fig. 4, the beam 7a has freedom for an up and down movement of each end of the beam. This is a result of the omission of the pivot 8a, shown in Fig. 1, and the replacement of that pivot by a pivot 70 extending through an intermediate portion of the beam 7a. In Fig. 4, the end of the beam 7a adjacent the flapper valve 12 is subjected to opposing vertical thrusts by signal units 1 and 1a which may be respectively like the elements 1 and 1a of Fig. 1. The other beam end 7b is subjected to opposing vertical thrusts by signal units 1b and 1ba.

These units 1b and 1ba may be constructed in a manner similar to the chamber 1 which is also shown in Fig. 4. There may be introduced into these chambers through the connections 5b and 5c additional input signals which are of different magnitudes than the input signal being applied to chamber 1 through the connection 5.

The present invention makes no claim to this multiplying type of controller per se. This invention does however concern itself with the provision of an apparatus for such a controller that will automatically prevent the output signal of such a controller from exceeding or going below a predetermined level.

The manner in which this maximizing and minimizing of the output pressure signal is accomplished except for the change in pivot position noted supra is identical to that already disclosed under the description of Fig. 1. As shown, the pivot 70 extends through an elongated slot 71 in the beam 7a and may be adjusted to and secured in different positions along the length of said slot when it becomes important to vary the relative torques impressed on the opposite end portions of the beam 7a by the units 1 and 1a, and by the units 1b and 1ba.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A control system combination comprising a beam operably connected to a stationary support at one of its ends to turn in a clockwise or counterclockwise direction about a first pivot axis that is transverse to the length of said beam, a conduit receiving fluid under pressure from a supply source and passing said fluid through a restricted passage to a bleed nozzle, a flapper valve adjusted by movements of said beam about said axis to vary the bleed nozzle pressure, a first means responsive to the bleed nozzle pressure to tilt said beam in one or the other of said directions as said bleed nozzle pressure increases and decreases, and a second means to pivotally adjust said flapper valve about a second axis located on and transverse to the longitudinal axis of said beam.

2. A control system combination comprising, a beam pivoted to turn in one direction or in the opposite direction about an axis transverse to and located at one end of said beam, a flapper having a slot formed in one of its end portions, a pin protruding from said beam end that is remote from said axis and in engagement with said slot to provide a pivot between said beam and said flapper, said flapper having another end portion adjacent to the open end of a bleed valve, an arm pivotally mounted at one of its ends to a stationary support member and at its other end to said flapper, a conduit receiving fluid under pressure from a supply source and passing said fluid through a restricted passageway to said bleed valve, said bleed valve being adjusted by movements of a force balancing control device operably connected to said beam to vary the bleed valve pressure and a motioned balanced device responsive to said bleed valve pressure for automatically altering the position of said pivot connection between said arm and flapper when said bleed valve pressure rises above or falls below a predetermined level.

3. A combination as specified in claim 2 in which the said transverse beam pivot is connected to a stationary support.

4. A control system combination comprising a beam pivoted to turn in one direction or in the opposite direction about an axis transverse to the beam length, a conduit receiving fluid under pressure from a supply source and passing said fluid through a restricted passage to a bleed nozzle, a flapper valve adjusted by movements of said beam about said axis to vary the bleed nozzle pressure, means responsive to the bleed nozzle pressure for tilting said beam in one or the other of said directions as said bleed nozzle pressure increases and decreases, and means responsive to variations in said bleed nozzle pressure for adjusting the flapper valve relative to said beam and relative to said bleed nozzle.

5. A combination as specified in claim 1, in which said second axis is located at an end of said flapper valve that is remote from said nozzle.

6. A control system combination comprising a beam pivoted to turn in one direction or in the opposite direction about a first axis transverse to the beam length, a conduit receiving fluid under pressure from a supply source and passing said fluid through a restricted passage to a bleed nozzle, a flapper valve adjusted by movements of said beam about said axis to vary the bleed nozzle pressure, means responsive to the bleed nozzle pressure for tilting said beam in one or the other of said directions as said bleed nozzle pressure increases and decreases, means for pivotally adjusting said flapper valve about a second axis that is located on and transverse to the longitudinal axis of said beam, said second axis being located at an end of said flapper valve that is remote from said nozzle, and means for varying the distance between the bleed nozzle and the flapper valve in response to variations in the bleed nozzle pressure.

7. A control system combination comprising a beam pivoted to turn in one direction or in the opposite direction about an axis transverse to and located at one end of said beam, a conduit receiving fluid under pressure from a supply source and passing said fluid through a restricted passage to a bleed nozzle, a flapper valve pivotally connected to the end of said beam remote from said beam pivot, said valve being adjusted by movements of said beam about said beam axis to vary the pressure of the fluid in said bleed nozzle, a control unit operatively connected to said beam between said beam pivot and said connection between said beam and said valve to tilt the latter in one direction or the other about said axis in response to variations in said bleed nozzle pressure, an arm pivotally mounted to a stationary member at one end and to said flapper at its other end and a motion balance means responsive to the pressure of said fluid in said bleed valve to move said arm and flapper attached thereto in a direction to maintain the pressure in said bleed nozzle within a minimum and maximum level only when said bleed nozzle pressure rises above or falls below a predetermined level.

8. A combination as specified in claim 7, including a pair of control units each of which has an expansible wall subjected to a pressure tending to tilt the beam in a direction opposite to the direction in which the other expansible wall tends to tilt said beam, means for subjecting one of said walls to a pressure dependent on the bleed nozzle pressure, and means for subjecting the other wall to a pressure which is independent of the bleed nozzle pressure.

9. A control system combination comprising a beam pivotally connected to a stationary support at one of its ends and pivotally mounted for movement with one end of a seesaw beam flapper at its other end, a chamber containing a flexible wall, a fluid pressure signal of varying magnitude acting on the said wall of said chamber, a conduit receiving fluid from a supply source and passing said fluid through a restricted passage to a bleed nozzle, said nozzle being positioned in close proximity with and perpendicular to the other end of said flapper, said flexible wall being so arranged with respect to said beam that a signal of increasing magnitude will move said flapper toward and increase the pressure of the fluid in said nozzle and a signal of decreasing magnitude will move the flapper away and decrease the pressure of the fluid in said nozzle, an output pressure chamber having a flexible member, said output pressure chamber being operably connected to said fluid in said nozzle and an output transmission line, said flexible member being operably connected to said beam to force balance the latter in accordance with movements of said flapper, an expandable motion balance means connected to and actuated by said pressure of the fluid in said nozzle, said last mentioned means being operably connected to the said flapper for rotating same toward or away from said nozzle only when the fluid pressure in said nozzle is abnormally lowered or raised by the opposite rotary motion of said beam, said motion of said expandable motion balance means acting to maintain said fluid in said output pressure chamber and transmission line attached thereto between predetermined levels.

10. The combination as specified in claim 9 wherein said operable flapper connection of said expandable motion balance means comprises two independently adjustable screw means for altering the relative position of the motion balance means with respect to said beam, said adjustment of said screw means affording a means by which each or both of said predetermined levels may be altered.

11. The combination of a force balanced and motion balanced unit in a fluid pressure controlling and transmitting apparatus to transduce the magnitude of an input signal fed into said apparatus into an output pressure signal whose magnitude is proportional to said input signal and which output signal is within a predetermined minimum and maximum level comprising, a force balancing means for producing a regulated output pressure signal in accordance with the magnitude of said input signal, and a motion balanced means operably connected to said force balancing means through a mechanism actuated by the pressure of said last mentioned output pressure signal to retain this signal within said predetermined minimum and maximum pressure levels.

12. A combination as specified in claim 11 wherein output pressure actuated mechanism includes an adjustable mechanical stop means for preventing the pressure relationship of the said input signal and any signal having a magnitude beyond said minimum and maximum pressure levels from exceeding or dropping below a predetermined value.

13. A control apparatus comprising a transducer for converting an input force of varying magnitude into a proportional output pressure signal and an automatically self regulated means activated in accordance with the pressure of said signal and operably connected to said transducer to restrict the magnitude of said force being converted into said signal from exceeding a predetermined minimum and maximum level.

14. A control apparatus as specified in claim 13 wherein said operable connection of said self regulating means includes an adjustable means for separately or jointly altering said pressure levels.

15. A control system combination comprising, a beam operably connected to a stationary support at a portion of said beam that is located adjacent one end of said beam to turn in a clockwise or counterclockwise direction about a first pivot axis that is transverse to the length of said beam, a conduit receiving fluid under pressure from a supply source and passing said fluid through a restricted passage to a bleed-nozzle, a flapper valve adjusted by movements of said beam about said pivot to vary the bleed nozzle pressure, a first means responsive to the bleed nozzle pressure to tilt said beam in one or the other of said directions as said bleed nozzle pressure increases and decreases and a second means to pivotally adjust said flapper valve about a second axis located on and transverse to the longitudinal axis of said beam.

References Cited in the file of this patent

UNITED STATES PATENTS

| | | |
|---|---|---|
| 2,285,540 | Stein | June 9, 1942 |
| 2,454,946 | Rosenberger | Nov. 30, 1948 |
| 2,512,561 | Ziegler | June 20, 1950 |
| 2,658,392 | Vannah | Nov. 10, 1953 |
| 2,675,818 | Gallo | Apr. 20, 1954 |
| 2,688,253 | Markson | Sept. 7, 1954 |
| 2,699,795 | Gray | Jan. 18, 1955 |
| 2,771,772 | Kirwan | Nov. 27, 1956 |